Feb. 2, 1937. W. J. DEMPSTER 2,069,698
TRANSPORTING AND DUMPING VEHICLE
Filed May 6, 1936 2 Sheets-Sheet 1
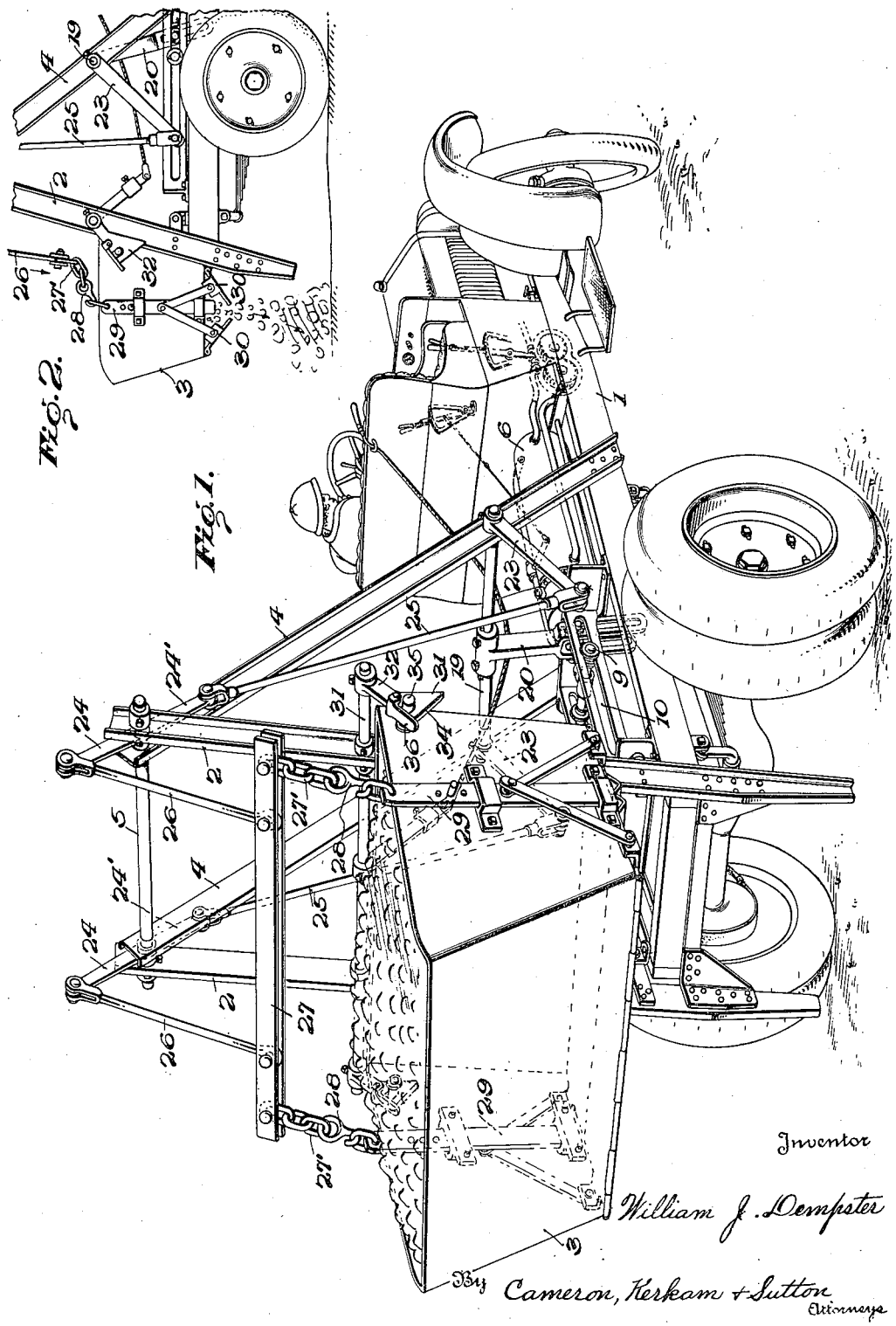
Inventor
William J. Dempster
By Cameron, Kerkam & Sutton
Attorneys

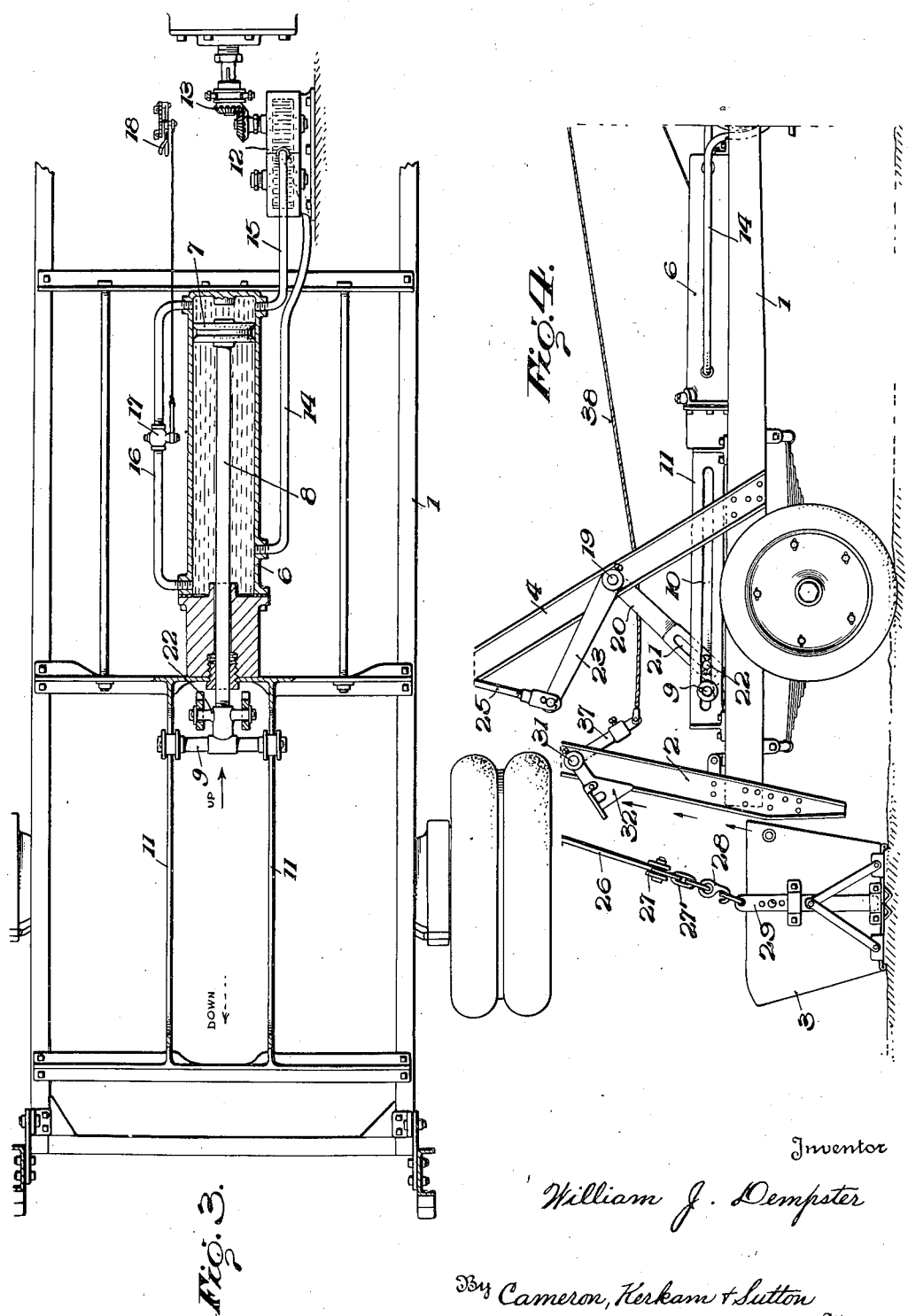

Patented Feb. 2, 1937

2,069,698

UNITED STATES PATENT OFFICE 2,069,698

TRANSPORTING AND DUMPING VEHICLE

William J. Dempster, Knoxville, Tenn.

Application May 6, 1936, Serial No. 78,287

3 Claims. (Cl. 214—77)

This invention relates to means for transporting material from one location to another and dumping the same upon arrival at the desired destination.

It has heretofore been proposed to mount a suitable power cylinder and its associated piston and piston rod upon a vehicle such as an automotive truck and by means of said power device to operate a system of cables passing over a series of pulleys and connected to a suitable container for the materials to be transported. Such a system is expensive to construct and subject to rapid depreciation, and one of the objects of the present invention is to provide means for connecting a power cylinder to the container that shall be simple in construction and more durable in character.

It has also heretofore been proposed to provide containers for the material to be transported, which containers are provided with a downwardly opening door or doors hinged to the container and connected to elevating mechanism for the container to the end that when the container is elevated the doors will be held closed, and means have been provided to form a suitable catch for holding the doors closed until tripped at the will of the operator, whereupon the weight of the material in the container serves to open the doors. By this means the doors are held closed even though the power mechanism may be operated to lower the container.

According to the present invention the container is elevated by means of lever mechanism connecting a power cylinder with the container, which container, when elevated to the desired position for transportation, is engaged by a suitable catch and held in such elevated position, the power mechanism serving to hold the bottom door or doors closed until the point is reached where the contents are to be discharged. At this point the power mechanism releases the doors and permits them to open downward in response to their own weight and the weight of the material in the container, which container, however, remains in its elevated position.

The invention is capable of being embodied in a variety of mechanical expressions, one of which for the purpose of illustrating the invention, is shown in the accompanying drawings, but it is to be expressly understood that such drawings are for the purpose of illustrating the invention only and are not designed to define the limits of the invention, reference being had to the appended claims for this purpose.

In said drawings, Fig. 1 is a perspective view of the dumping vehicle showing the container in elevated position and power mechanism in position to hold the bottom doors thereof closed;

Fig. 2 is a side elevation in broken detail showing the container retained in elevated position with the elevating mechanism lowered, whereby the bottom doors are permitted to open and dump the contained material;

Fig. 3 is a plan view of a preferred form of power cylinder mounted upon the chassis of an automotive truck; and Fig. 4 is a broken side elevation of the container in its lowered position showing the corresponding position of the parts of the lever mechanism for elevating the same.

Referring to said drawings, 1 is a chassis or frame of any suitable vehicle, here shown as that of an automotive truck, 2—2 are two upwardly extending and preferably slightly rearwardly inclined angle bars which form a track or way along which the container 3 travels in its up and down movement. The bars 2—2 of the track or way are suitably braced by angle bars 4—4 secured at their lower ends to the side bars of the chassis 1 and at their upper ends to the members 2—2 of the track or way. As here shown, they are so secured by means of a rod 5 which extends through the bars 4—4 and the members 2—2 of the track or way.

Suitably mounted on the chassis is a cylinder 6 having a piston 7 therein. The piston rod 8 extends outward through the rear end of the cylinder, and has attached to the rear end thereof a cross bar 9, the ends of which travel in a suitable track or way, such as the slots 10 of side bars 11—11. This cylinder 6 is filled with liquid on both sides of the piston 7, and a pump 12, of any suitable character, is provided for pumping the liquid from either side to the other side of the piston in said cylinder. This pump is preferably connected to the motor of the motor vehicle, as shown at 13.

Referring now to Fig. 3, by pumping the liquid in the cylinder from the forward side of the piston 7 to the rear side of the piston through the conduits 14 and 15 the piston may be forced outward, and by reversing the pump 12 the liquid may be pumped from the rear side of the piston to the forward side thereof when desired. 16 is a by-pass conduit extending from one end to the other end of the cylinder. This by-pass is normally closed by a valve 17 which may be opened at will by the operator. As here shown, this may be accomplished by a connection to the lever 18 near the driver's seat.

Referring to Fig. 1, 19 is a rod mounted to turn in bearings in the brace bars 4—4 and has rigidly connected therewith a downwardly extending lever 20 having a slot 21 (Fig. 4) in the lower end thereof. Preferably the lever 20 is forked at its lower end and each of the tines of the fork are provided with slots 21, and a cross rod or bar 22, connected to the piston rod 8 engages in these slots, so that as the piston rod moves in and out the lever 20 is actuated and serves to turn the rod 19 on its axis. Keyed to the rod 19, preferably at the opposite ends thereof, are two levers 23—23, and fulcrumed on the cross rod 5 are two levers 24—24. The forward arms 24' of these levers 24—24 are connected by rods 25 to the corresponding lever 23. The others, and here shown as the rearward arms of the levers 24, are connected by suitable rods 26—26 with a bail piece for the container, which bail piece is composed of a cross bar 27 having downwardly extending portions, here shown in the form of short chains 27', which chains have two means, here shown in the form of hooks 28, for engagement with two bars 29—29 mounted to slide vertically on the opposite ends of the container 3. These bars are connected in any suitable manner with downwardly opening hinged doors 30, the doors being so constructed that when raised into closed position they close the bottom of the container. They also extend somewhat beyond the ends of the container so that the doors serve as means through which the power is applied to lift the container.

Extending through the side bars 2—2, at approximately the highest position of the container when elevated, is a transverse rod 31 which is mounted in the side bars 2 to turn therein. Keyed to the bar 31 so as to be rigid therewith are catches 32 having downwardly extending portions 33 whose rearward faces are beveled as shown at 34. These catches are notched for receiving pins 35 extending outward from the ends of the container 3 near the top thereof. A piece 36 is pivoted to each catch with its lower end extending slightly beyond the face of the bevel 34.

In operation, when the piston 7 is moved into the position shown in Fig. 3, the piston rod 8, acting through the lever 20 and the connecting lever mechanism, raises the bail 27. In the upward movement of the bail the hinged doors are held closed, and the entire container moves upward and as it nearly reaches its elevated position, the pins 35 engage the bevel face 34 of the catches 32, lifting the pivoted bars 36, and upon a very slight lowering of the container, the pins 35 rest in the catches, which serve to retain the container in its elevated position. The container being thus supported in its elevated position any lowering of the bail piece 27 permits the weight of the material in the container, as well as the weight of the pivoted doors to swing said doors into open position (as illustrated in Fig. 2) and dump the contents of the container. The cross bar 31 has a lever 37 (Fig. 4) rigidly connected therewith, and the lower end of this lever has a suitable cable 38 extending to the seat of the driver, and upon exerting a pull upon this cable 38 the bar 31 is turned so as to withdraw the catches 32 from the pins 35 of the container, and thereupon the container may be lowered by passing the fluid in the cylinder 6 from the left-hand side to the right-hand side of the piston 7 (when viewed as in Fig. 3), and thereupon the container 3 may be lowered to the ground as shown in Fig. 4 in position to be refilled.

It will be appreciated that the lever mechanism connecting the piston to the bail piece of the container is of extremely simple construction, is durable and little liable to get out of order, and it will be further appreciated that the dumping of the container, as well as raising and lowering the same, is entirely under control of the driver of the vehicle.

Having thus described the invention, what is claimed is:

1. The combination of a vehicle, an upwardly extending track or way mounted thereon, a container movable along said track or way, a supporting bail therefor, catch mechanism independent of said bail and engaging and supporting said container in its elevated position, a bottom door hinged to said container, means connecting said bail and door, a cylinder mounted on said vehicle, a piston and piston rod in said cylinder, a source of power for reciprocating said piston and rod in said cylinder, and lever mechanism operatively connecting said piston rod to said bail.

2. The combination of a vehicle, an upwardly extending track or way mounted thereon, a container movable along said track or way, a door hinged to the bottom of said container, a pair of slides one on each end of said container, said slides being operatively connected to said door, a bail piece, means connecting the bail piece to said slides, a piston and piston rod, a source of power to reciprocate said piston and rod, and lever mechanism operatively connecting said piston rod and bail piece.

3. The combination of a vehicle, an upwardly extending track or way, a container movable along said track or way, a downwardly opening bottom door hinged to said container, a bail piece connected to said door and holding the door closed when the said bail piece is raised, power mechanism connected to said bail piece and a catch engaging and holding the container in elevated position independent of the door, whereby the door may swing open and the container be held in elevated position when the bail piece is lowered.

WILLIAM J. DEMPSTER.